US011995169B2

(12) United States Patent
Trelin

(10) Patent No.: US 11,995,169 B2
(45) Date of Patent: May 28, 2024

(54) BIOMETRIC TEMPLATE TRANSLATION

(71) Applicant: Alclear, LLC, New York, NY (US)

(72) Inventor: Joe Trelin, New York, NY (US)

(73) Assignee: SECURE IDENTITY, LLC, New York, NY (US)

(*) Notice: Subject to any disclaimer, the term of this patent is extended or adjusted under 35 U.S.C. 154(b) by 0 days.

(21) Appl. No.: 18/120,660

(22) Filed: Mar. 13, 2023

(65) Prior Publication Data

US 2023/0222196 A1 Jul. 13, 2023

Related U.S. Application Data

(62) Division of application No. 16/934,371, filed on Jul. 21, 2020, now Pat. No. 11,630,890.

(60) Provisional application No. 62/879,746, filed on Jul. 29, 2019.

(51) Int. Cl.
*G06V 40/13* (2022.01)
*G06F 16/11* (2019.01)
*G06F 21/32* (2013.01)
*G06V 10/75* (2022.01)
*G06V 40/10* (2022.01)
*G06V 40/12* (2022.01)
*G06V 40/40* (2022.01)

(52) U.S. Cl.
CPC ............ *G06F 21/32* (2013.01); *G06F 16/116* (2019.01); *G06V 10/751* (2022.01); *G06V 40/10* (2022.01); *G06V 40/1365* (2022.01); *G06V 40/40* (2022.01)

(58) Field of Classification Search
CPC ... G06F 21/32; G06F 16/116; G06V 40/1365; G06V 40/10; G06V 40/40; G06V 10/751
See application file for complete search history.

(56) References Cited

U.S. PATENT DOCUMENTS

| | | |
|---|---|---|
| 8,381,969 B1 | 2/2013 | Miller et al. |
| 8,423,462 B1 | 4/2013 | Amacker et al. |
| 8,521,131 B1 | 8/2013 | Ramalingam et al. |
| 8,744,966 B1 | 6/2014 | Amacker et al. |
| 8,965,170 B1 | 2/2015 | Benea |
| 9,107,064 B1 | 8/2015 | Ramalingam et al. |
| 9,166,961 B1 | 10/2015 | Johansson et al. |
| 9,202,105 B1 | 12/2015 | Wang et al. |
| 9,324,098 B1 | 4/2016 | Agrawal et al. |
| 9,386,507 B1 | 7/2016 | Ramalingam et al. |
| 9,607,138 B1 | 3/2017 | Baldwin et al. |

(Continued)

*Primary Examiner* — Stephen G Sherman
(74) *Attorney, Agent, or Firm* — Brownstein Hyatt Farber Schreck, LLP

(57) ABSTRACT

A system translates a first biometric template of a first type to enable comparison with a second biometric template of a second type. In one example, a canonical template structure to which the first and second biometric templates adhere may be identified and used to compare corresponding portions of the first and second biometric templates. In another example, types and associated formats of the first and second biometric templates may be identified to enable both to be translated to a general format that can then be compared. In still other examples, an identification system may use the first biometric template to determine an identity associated with first biometric data to either retrieve second stored biometric data associated with the identity of a same type as the second biometric template or verify that an account in an external system having a record storing the second biometric template is associated with the identity.

20 Claims, 7 Drawing Sheets

(56) References Cited

U.S. PATENT DOCUMENTS

| | | |
|---|---|---|
| 9,609,577 B1 | 3/2017 | Ramalingam et al. |
| 9,681,350 B1 | 6/2017 | Marupaduga et al. |
| 9,681,359 B2 | 6/2017 | Ramalingam et al. |
| 9,723,131 B1 | 8/2017 | Ramalingam et al. |
| 9,836,642 B1 | 12/2017 | Ramaswamy |
| 9,934,504 B2 | 4/2018 | Wang et al. |
| 9,967,250 B2 | 5/2018 | Johansson et al. |
| 10,027,662 B1 | 7/2018 | Mutagi et al. |
| 10,055,740 B2 | 8/2018 | Hanson et al. |
| 10,104,181 B1 | 10/2018 | Rao et al. |
| 10,108,791 B1 | 10/2018 | Masterman |
| 10,108,961 B2 | 10/2018 | Wang et al. |
| 10,122,727 B2 | 11/2018 | Johansson et al. |
| 10,235,669 B2 | 3/2019 | Amacker et al. |
| 10,242,364 B2 | 3/2019 | Wang et al. |
| 10,243,945 B1 | 3/2019 | Kruse et al. |
| 11,151,481 B1 | 10/2021 | Sun et al. |
| 2004/0221303 A1 | 11/2004 | Sie |
| 2014/0189720 A1 | 7/2014 | Terrazas |
| 2015/0294515 A1 | 10/2015 | Bergdale |
| 2016/0189063 A1 | 6/2016 | Nie |
| 2016/0226868 A1 | 8/2016 | Harding et al. |
| 2016/0358010 A1 | 12/2016 | Yang et al. |
| 2017/0188103 A1 | 6/2017 | Pan |
| 2018/0007060 A1 | 1/2018 | Leblang et al. |
| 2019/0036939 A1 | 1/2019 | Johansson et al. |
| 2019/0050631 A1 | 2/2019 | Hayase |

BIOMETRIC TEMPLATE TRANSLATION

CROSS-REFERENCE TO RELATED APPLICATION(S)

This application is a divisional patent application of U.S. patent application Ser. No. 16/934,371, filed Jul. 21, 2020 and titled "Biometric Template Translation," which is a nonprovisional patent application of and claims the benefit of U.S. Provisional Patent Application No. 62/879,746, filed Jul. 29, 2019 and titled "Biometric Template Translation," the disclosures of which are hereby incorporated herein by reference in their entireties.

FIELD

The described embodiments relate generally to biometric identification. More particularly, the present embodiments relate to translation between biometric templates.

BACKGROUND

Use of biometrics (such as one or more fingerprints, blood vessel scans, palm-vein scans, voiceprints, facial images, retina images, iris images, deoxyribonucleic acid sequences, heart rhythms, gaits, and so on) to establish a person's identity is increasingly common. Biometrics may be used to unlock electronic devices, retrieve sensitive information, enter secure areas (such as airport terminals, event venues, and so on), rent or purchase goods and/or services, and so on. A variety of different technologies may be used in a variety of different implementations to establish a person's identity using biometrics.

SUMMARY

The present disclosure relates to biometric template translation that enables comparison of different types of biometric templates. A first biometric template of a first type is translated in order to enable the translated biometric template to be compared to a second biometric template of a second type. In one example, a canonical template structure to which the first and second biometric templates adhere may be identified and used to compare corresponding portions of the first and second biometric templates. In another example, types and associated formats of the first and second biometric templates may be identified to enable both to be translated to a general format that can then be compared. In still other examples, an identification system may use the first biometric template to determine an identity associated with first biometric data and retrieve second biometric data of a same type as the second biometric template. In still other examples, an identification system may use the first biometric template to determine an identity associated with first biometric data and verify that an account in an external system having a record storing the second biometric template is also associated with the identity, thus allowing translation between the first and second biometric templates through mutual association with the same identity. In this way, the biometric template translation may enable compatibility between different biometric systems. This may prevent duplication of systems and/or components, enable functions not previously performable, improve hardware and/or software performance of systems and/or components, and/or reduce consumption of hardware and/or software resources.

In various embodiments, a system for biometric template translation includes at least one non-transitory storage medium that stores instructions and at least one processing unit. The at least one processing unit executes the instructions to access a first biometric template of a first type and a second biometric template of a second type, identify a canonical template structure to which the first biometric template and the second biometric template adhere, and compare the first biometric template and the second biometric template using the canonical template structure.

In some examples, the at least one processing unit compares the first biometric template and the second biometric template by using the canonical template structure to identify corresponding portions of the first biometric template and the second biometric template and comparing the corresponding portions. In various implementations of such examples, the at least one processing unit determines that the first biometric template and the second biometric template are from a same person when the corresponding portions match. In some implementations of such examples, the at least one processing unit determines that the first biometric template and the second biometric template are from different people when the corresponding portions are dissimilar.

In various examples, the at least one processing unit accesses the first biometric template from a first record in a first system, accesses the second biometric template from a second record in a second system, and determines whether the first record and the second record are for a same person by comparing the first biometric template and the second biometric template. In some examples, the first biometric template and the second biometric template are both digital representations of at least one of fingerprints, blood vessel scans, palm-vein scans, voiceprints, facial images, retina images, iris images, deoxyribonucleic acid sequences, heart rhythms, or gaits. In a number of examples, the canonical template structure details standard features of biometric templates that adhere to the canonical template structure.

In some embodiments, a system for biometric template translation includes at least one non-transitory storage medium that stores instructions and at least one processing unit. The at least one processing unit executes the instructions to access a first biometric template, identify a first type of the first biometric template, determine a first format associated with the first type, use the first format to translate the first biometric template to a general format version of the first biometric template, and compare the general format version of the first biometric template with a second biometric template.

In various examples, the at least one processing unit compares the general format version of the first biometric template with a second biometric template by identifying a second type of the second biometric template, determining a second format associated with the second type, using the second format to translate the second biometric template to a general format version of the second biometric template, and comparing the general format version of the first biometric template with the general format version of the second biometric template.

In some examples, the at least one processing unit accesses the first biometric template via a first external system and the second biometric template via a second external system. In various implementations of such examples, the first biometric template is associated with a first record stored by the first external system and the second biometric template is associated with a second record stored by the second external system. In some implementations of such examples, the at least one processing unit receives the first biometric template from the first external system.

In various examples, the at least one processing unit identifies the first type by analyzing the first biometric template. In some examples, the at least one processing unit identifies the first type using a type indicator associated with the first biometric template.

In a number of embodiments, a system for biometric template translation includes at least one non-transitory storage medium that stores instructions and at least one processing unit. The at least one processing unit executes the instructions to determine an identity of a person in an identification system using a first biometric template and first stored biometric data for the person, determine a type associated with a second biometric template, access second stored biometric data that is associated with the identity in the identification system and corresponds to the type, and compare the second biometric template to the second stored biometric data.

In various examples, the at least one processing unit associates at least one of the first biometric template or the second biometric template with a third biometric template stored in a record in an external system when the identity is associated with an account in the external system that corresponds to the record. In some implementations of such examples, the at least one processing unit stores the third biometric template in association with the identity upon associating the at least one of the first biometric template or the second biometric template with the third biometric template.

In a number of examples, the identification system stores identity information for the person and controls access to the identity information using the first stored biometric data. In some examples, the identification system stores multiple sets of biometric data for the person that are each associated with different template types. In various examples, the first biometric template and the second biometric template are of different types.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
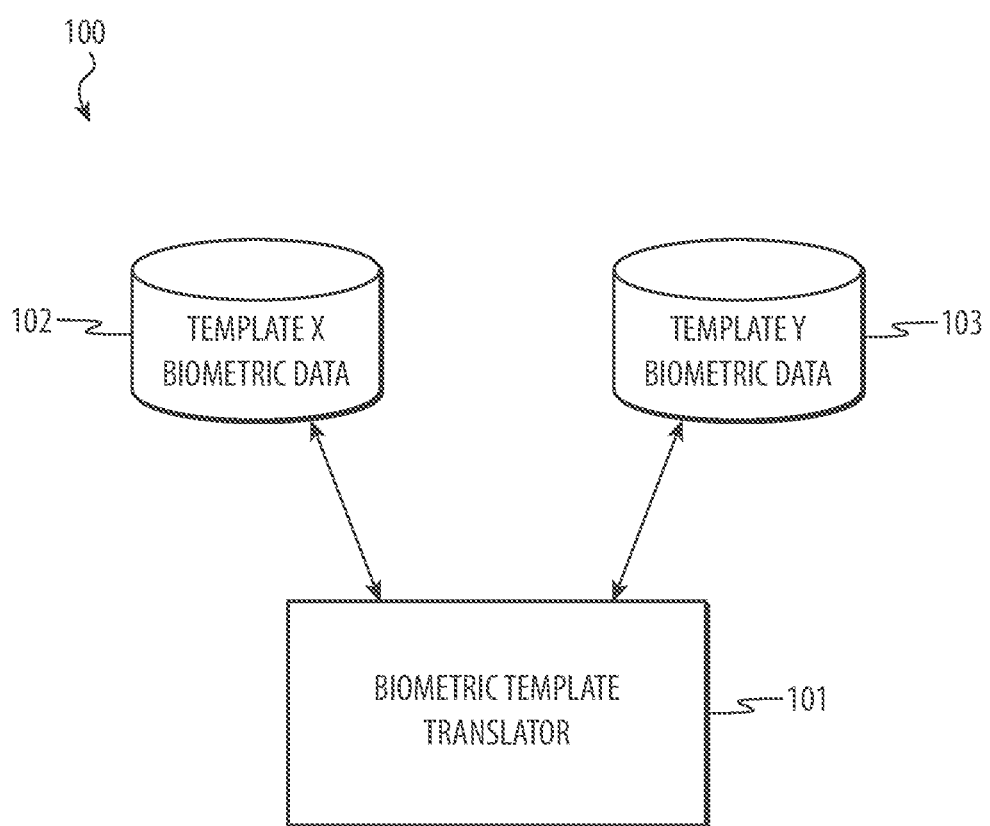
FIG. 1 depicts a first example system for biometric template translation.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, apparatuses, and computer program products that embody various elements of the present disclosure. However, it should be understood that the described disclosure may be practiced in a variety of forms in addition to those described herein.

As part of biometric identification, biometric templates may be generated and provided to a matching engine that compares the biometric templates to stored biometric data. A biometric template may be generated by digitizing an obtained biometric (e.g., a biometric image or the like) and formatting the resulting digital data according to a particular format (e.g., a type of the biometric template) used by the matching engine. "Formatting," as used herein, may mean cropping, skewing, hashing, compressing, mathematically expressing features and/or relationships among features, or otherwise manipulating part or all of a data set derived from the biometric, such as a biometric image. The stored biometric data may also be a biometric template formatted according to a particular format (e.g., type); the stored biometric data's type may or may not match that of the generated biometric template. This procedure may be performed for a variety of different kinds of biometrics. This may allow the matching engine to compare the biometric templates to the stored biometric data as long as both are configured according to a particular type (e.g., formatted in a particular way) expected by the matching engine.

Different matching engines (such as those provided by Innovatrics™, Chui™, Rank One Computing™, BioMoRF Systems Limited™, FotoNation™, and so on) may use different types of biometric templates (e.g., biometric templates that are formatted in different ways). Even for the same biometric (such as one or more fingerprints, blood vessel scans, palm-vein scans, voiceprints, facial images, retina images, iris images, deoxyribonucleic acid sequences, heart rhythms, gaits, and so on), images and/or other data may be cropped in different ways, features and/or relationships among features may be expressed differently mathematically, the same data may be represented in different portions, data may be hashed and/or compressed differently, and so on. As a result, biometric templates generated for one matching engine may not be capable of being compared to biometric data previously generated for another matching engine. This may cause different biometric systems to be incompatible, necessitating duplicate systems and/or components and/or excess processing and/or hardware and/or software resources.

The following disclosure relates to biometric template translation that enables comparison of different types of biometric templates. A first biometric template of a first type is translated in order to enable the translated biometric template to be compared to a second biometric template of a second type. In one example, a canonical template structure to which the first and second biometric templates adhere may be identified and used to compare corresponding portions of the first and second biometric templates. In another example, types and associated formats of the first and second biometric templates may be identified to enable both to be translated to a general format that can then be compared. In still other examples, an identification system may use the first biometric template to determine an identity associated with first biometric data and retrieve second biometric data of a same type as the second biometric template. In still other examples, an identification system may use the first biometric template to determine an identity associated with first biometric data and verify that an account in an external system having a record storing the second biometric template is also associated with the identity, thus allowing translation between the first and second biometric templates through mutual association with the same identity. In this way, the biometric template translation may enable compatibility between different biometric systems. This may prevent duplication of systems and/or components, enable functions not previously performable, improve hardware and/or software performance of systems and/or components, and/or reduce consumption of hardware and/or software resources.

These and other embodiments are discussed below with reference to FIGS. 1-7. However, those skilled in the art will readily appreciate that the detailed description given herein with respect to these Figures is for explanatory purposes only and should not be construed as limiting.

FIG. 1 depicts a first example system 100 for biometric template translation. The system includes a biometric template translator 101. The biometric template translator 101 may translate between biometric template of a first type and biometric template of a second type.

For example, the biometric template of the first type may be stored in a first data store 102 and the biometric template of the second type may be stored in a second data store 103. However, it is understood that this is an example. In various implementations, the biometric template of the first type and the biometric template of the second type may be stored in the same data store.

The biometric template of the first type and the biometric template of the second type may be generated for one or more different matching engines (such as Innovatrics™, Chui™ Rank One Computing™, BioMoRF Systems Limited™, FotoNation™, and so on) using one or more biometrics (such as one or more fingerprints, blood vessel scans, palm-vein scans, voiceprints, facial images, retina images, iris images, deoxyribonucleic acid sequences, heart rhythms, gaits, and so on). Both of the biometric template of the first type and the biometric template of the second type may include hashes and/or other digital representations of the biometrics. As the biometric template of the first type and the biometric template of the second type may be generated as different types, the biometric template of the first type and the biometric template of the second type may be generated and/or formatted differently. As the biometric template of the first type and the biometric template of the second type are of different types, they may not be comparable to each other until translated by the biometric template translator 101.

For example, the biometric template translator 101 may identify a canonical template structure to which both the first type and the second type adhere. For example, a canonical template structure may be a specification of how different types of templates all similarly format different portions of a biometric template. The canonical template structure may not specify how all portions of a biometric template are formatted, so different types of biometric templates may still be possible if the different types of biometric templates format the specified portions according to the canonical template structure but format other portions differently. Biometric templates may adhere to the canonical template structure if the biometric templates are formatted according to all of the specifications that are included in the canonical template structure. The biometric template translator 101 may use the canonical template structure to compare corresponding portions of the biometric template of the first type and the biometric template of the second type.

By way of another example, the biometric template translator 101 may identify the respective types of the biometric template of the first type and the biometric template of the second type. The biometric template translator 101 may determine a format that is associated with each of those types, use the determined formats to translate the biometric template of the first type and/or the biometric template of the second type to a general format version, and compare the general format versions. For example, each type of biometric template may be formatted in a particular way. By identifying the type of a biometric template, the biometric template translator 101 may able to determine how the data of that biometric template is formatted, convert that formatted data into a general format version, and then compare that general format version to other general format versions of biometric templates.

In yet another example, the biometric template translator 101 may use the biometric template of the first type to determine an identity associated with first biometric data in an identification system. For example, the identification system may identity people by matching received biometric templates to stored biometric data that is associated with identities. Further, the identification system may store biometric data of different types. Because the identification system stores the biometric data of the different types associated with the same identity, there is a certainty that the biometric data of the different types are all for the same person. When the identification system determines an identity by matching a biometric template to stored biometric data of one type, the identification system may be able to retrieve stored biometric data of other types that area also associated with the same identity. This may enable the identification system to provide access to stored biometric data of a particular desired type that is also associated with a identity after the identification system has determined the identity. As such, the biometric template translator 101 may translate between the biometric template of the first type and the biometric template of the second type by using the biometric template of the first type to determine an identity, accessing stored biometric data of the second type stored by the identification system associated with the identity, and comparing that to the biometric template of the second type. Alternatively and/or additionally, the biometric template translator 101 may verify that an account in an external system having a record storing the biometric template of the second type is associated with the determined identity, thus allowing translation between the first and second biometric templates through mutual association with the same identity.

Figure 2:
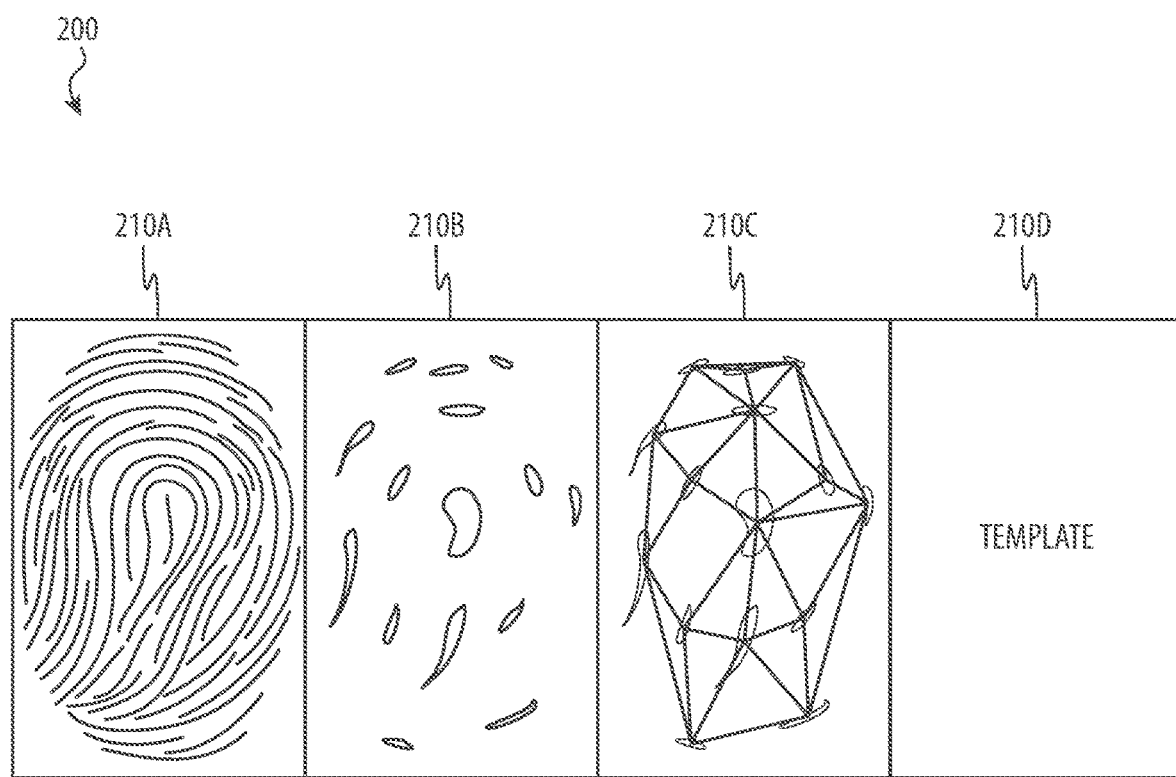
FIG. 2 depicts an example of generating a biometric template from a biometric.

FIG. 2 depicts an example 200 of generating a biometric template 210D from a biometric data 210A. In this example, a biometric data 210A may be captured. A set of features 210B may be identified from the biometric data 210A. Relationships 210C between the set of features 210B may be identified, such as a map of relative differences and displacements between the set of features 210B. A biometric template 210D may then be generated by mathematically representing the relationships 210C between the set of features 210B.

Biometric templates 210D of different types may be generated from biometrics 210A. For example, different biometric templates 210D may be generated by differently cropping an image of the biometric data 210A and/or otherwise extracting data from different portions thereof, identifying different sets of features 210B, differently mapping relationships 210C between the set of features 210B, differently mathematically representing the relationships 210C between the set of features 210B, differently formatting the mathematical representations of the relationships 210C between the set of features 210B, differently hashing and/or compressing data, and so on. Thus, different types of biometric templates 210D may be generated from the same biometric data 210A. The techniques of the present disclosure may be used to translate between these different types of biometric templates 210D to enable comparison despite the different types (e.g., different formatting).

In FIG. 2, the biometric data 210A is illustrated as a fingerprint and the relationships 210C between the set of features 210B are relative differences and displacements of data points of the fingerprint. However, it is understood that this is an example. Different biometrics, such as fingerprints, faces, irises, and so on may all have features (such as corners of a mouth or shapes of eyes) that may be identified from respective biometric data and mapped to compare relative differences and displacements. As such, relationships 210C between sets of features 210B for a variety of different biometric data 210A may be mathematically represented in order to generate biometric templates 210D of various different types or formats without departing from the scope of the present disclosure. The illustration of the biometric data 210A as a fingerprint image in FIG. 2 is not intended to be limiting.

Figure 3:
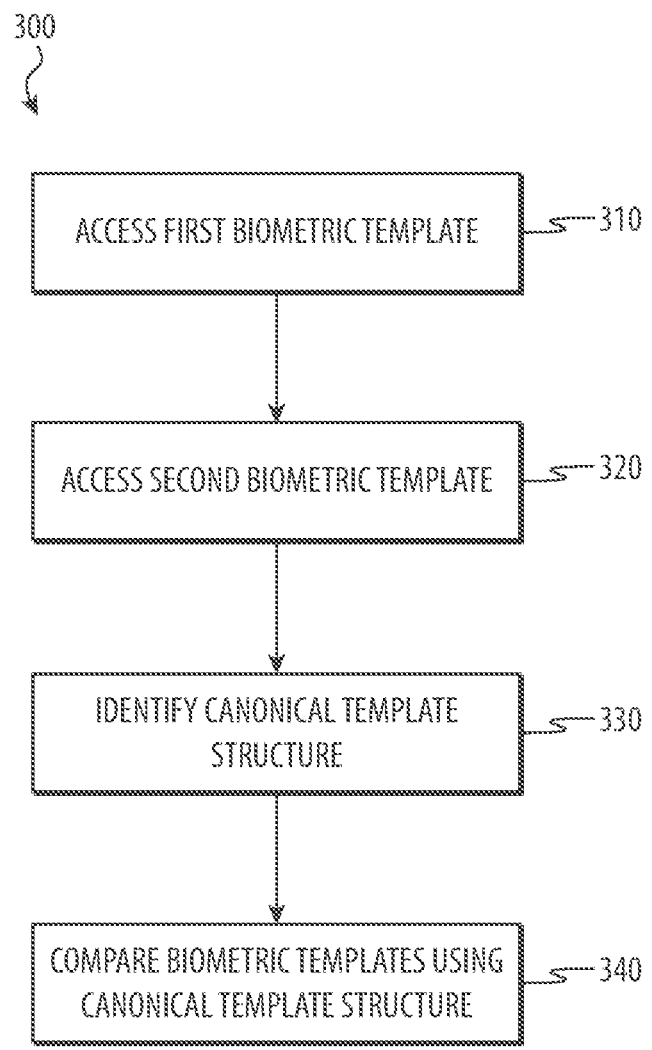
FIG. 3 is a flow chart illustrating a first example method for biometric template translation. This method may be performed by the systems of FIG. 1 or 5.

FIG. 3 is a flow chart illustrating a first example method 300 for biometric template translation. This method 300 may be performed by the system 100 of FIG. 1 (and/or the system 500 of FIG. 5 discussed below).

At operation 310, an electronic device (such as the biometric template translator 101 of FIG. 1 and/or the identification system device 501 of FIG. 5 discussed below) may access a first biometric template. At operation 320, the electronic device may access a second biometric template. The first and second biometric templates may be of different types. In other words, the first and second biometric templates may be formatted differently for different matching engines despite possibly being generated from the same biometric. For example, images and/or other data may be cropped in different ways, features and/or relationships among features may be expressed differently mathematically, the same data may be represented in different portions, data may be hashed and/or compressed differently, and so on.

At operation 330, the electronic device may identify a canonical template structure. The canonical template structure may be one to which the first and second biometric templates both adhere. A canonical template structure may be a specification of how different types of templates all similarly format different portions of a biometric template. The canonical template structure may not specify how all portions of a biometric template are formatted, so different types of biometric templates may correspond to a single canonical template structure. For example, the different types of biometric templates may format specified portions according to the canonical template structure but format other portions differently. Put another way, biometric templates may adhere to the canonical template structure if the biometric templates are formatted according to all of the specifications that are included in the canonical template structure.

For example, the canonical template structure may be a standard according to which different biometric templates adhere. The standard may detail standard features of biometric templates that adhere to the canonical template structure. As such, all biometric templates that adhere to the canonical template structure may have particular corresponding portions. The standard may be a lightweight standard such that a great amount of variety is possible between different formats that all adhere to the standard.

Although the canonical template structure may be a standard according to which different templates adhere, that does not mean that all standards for biometric templates are canonical template structures. A standard for a biometric template may be a canonical template structure if identification of the fact that two biometric templates adhere to the standard allow the two biometrics to be compared using the standard. A standard for a biometric template may not be a canonical template structure if identification of the fact that two biometric templates adhere to the standard do not allow the two biometrics to be compared using the standard. Some standards may include more flexibility than allows for use of the standards for comparing biometric templates of different types. Such standards may not specify sufficient canonical structure to be a canonical template structures and be usable in this way.

For example, an American National Standards Institute (ANSI) standard for biometrics may require biometric templates to be formatted as packet data including a header packet indicating that the biometric templates are compliant with the ANSI standard and at least one biometric data packet that may optionally relate to a fingerprint, and iris, and so on. However, identification that a biometric template for a fingerprint and a biometric template for an iris are both compliant with the ANSI standard may not enable comparison of the biometric template for the fingerprint and the biometric template for an iris. The ANSI standard may also not require adherence to specifications for how details of biometrics are represented and formatted in the biometric data packet even when corresponding the same biometric.

At operation 340, the electronic device may compare the first biometric template to the second biometric template using the canonical template structure. For example, the canonical template structure may be used to identify corresponding portions of the first and second biometric templates. The corresponding portions may then be compared.

If there is a match or substantial match, the electronic device may determine that the first and second biometric templates are from the same person. The electronic device may determine that the first and second biometric templates are from different people (and/or a determination that the first and second biometric templates are from the same person is not possible) when the corresponding portions are dissimilar.

By way of illustration, the example method 300 may be used to compare different biometric templates stored in different records in different systems, such as different medical records systems. For example, the electronic device may compare a first biometric template of a first type, such as one stored in and/or associated with a first medical record in a first medical system, with a second biometric template of a second type, such as one stored in a second medical record in a second medical system. As the first biometric template is of the first type and the second biometric template is of the second type, the electronic device may identify a canonical template structure to which the first and second biometric templates both adhere and use the canonical template structure to compare the first and second biometric templates. Based on the comparison, the electronic device may determine whether or not the records are for the same person by comparing the first and second biometric templates. If the electronic device determines the records are for the same person, the electronic device may link the records, copy information from one record to the other, and so on. Various configurations are possible and contemplated without departing from the scope of the present disclosure.

In some situations, comparison of the first biometric template to the second biometric template using the canonical template structure may not be 100% sufficient for matching. In some cases, additional steps and/or translations may be performed before matching is possible. For example, the first biometric template may be generated at a lower resolution than the second biometric template, which may affect the relationships that are determined among features and how these are represented. In such an example, comparison of the first biometric template to the second biometric template using the canonical template structure may be capable of comparing corresponding portions, but additional translation steps may be performed to account for the differences in how the relationships were determined among features and how these were represented before matching can be adequately certain.

In various examples, this example method 300 may be implemented as a group of interrelated software modules or components that perform various functions discussed herein. These software modules or components may be executed within a cloud network and/or by one or more computing devices, such as the biometric template translator 101 of FIG. 1 (and/or the identification system device 501 of FIG. 5 discussed below).

Although the example method 300 is illustrated and described as including particular operations performed in a particular order, it is understood that this is an example. In various implementations, various orders of the same, similar, and/or different operations may be performed without departing from the scope of the present disclosure.

For example, the example method 300 is illustrated and described as accessing both the first biometric template and the second biometric template. However, it is understood that this is an example. In some implementations, the electronic device may generate one or more of the first biometric template or the second biometric template from a biometric instead of accessing such from another source. Various configurations are possible and contemplated without departing from the scope of the present disclosure.

Figure 4:
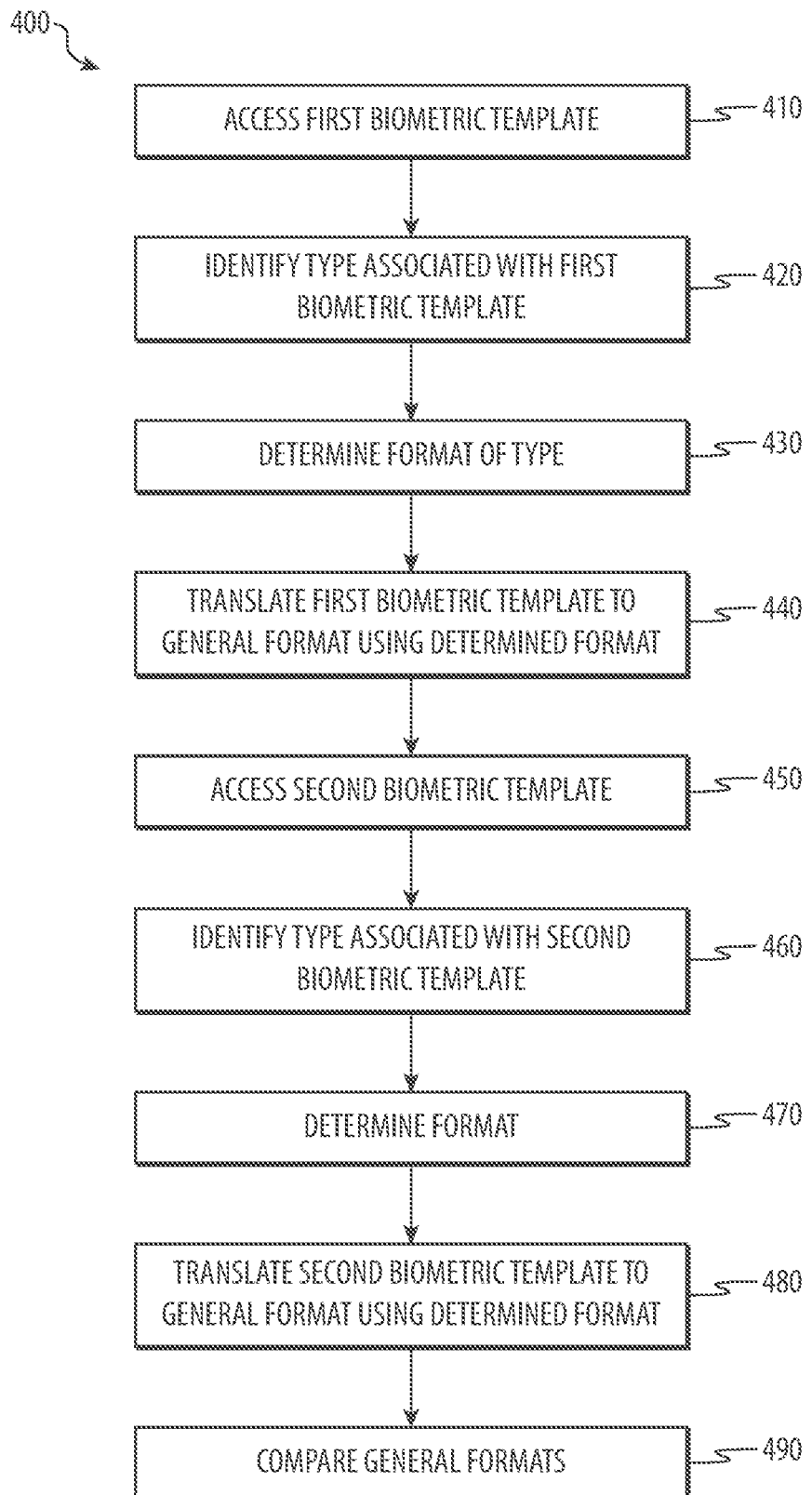
FIG. 4 is a flow chart illustrating a second example method for biometric template translation. This method may be performed by the systems of FIG. 1 or 5.

FIG. 4 is a flow chart illustrating a second example method 400 for biometric template translation. This method 400 may be performed by the system 100 of FIG. 1 (and/or the system 500 of FIG. 5 discussed below).

At operation 410, an electronic device (such as the biometric template translator 101 of FIG. 1 and/or the identification system device 501 of FIG. 5 discussed below) may access a first biometric template. At operation 420, the electronic device may identify a type associated with the first biometric template. For example, the first biometric template may be stored in a data structure that identifies the type and/or a matching engine to use with the first biometric template from which the type may be identified. By way of another example, the electronic device may analyze the format of the first biometric template to identify the type. In yet another example, a type indicator may be associated with the first biometric template that identifies the type. Various configurations are possible and contemplated without departing from the scope of the present disclosure.

At operation 430, the electronic device may determine the format of the type. In other words, the electronic device may determine how all biometric templates of that type are formatted. For example, different types of biometric templates may be formatted differently. The electronic device may access information for different types that specify the formats associated with the respective type. For example, the format may involve how images and/or other data are cropped, features and/or relationships among features are expressed mathematically, what data is represented in what portions, how data may be hashed and/or compressed, and so on.

At operation 440, the electronic device may translate the first biometric template to a general format using the determined format. The general format may be a standard for biometric templates. The general format may be a "universal" format to which different formatted biometric templates may be converted in order to compare them.

At operation 450, the electronic device may access a second biometric template. The second biometric template may be of a different type than the first biometric template. At operation 460, the electronic device may identify the type associated with the second biometric template. At operation 470, the electronic device may determine a format of the type associated with the second biometric template. At operation 480, the electronic device may translate the second biometric template to the general format using the determined format.

At operation 490, the electronic device may compare the general format versions of the first and second biometric templates. The electronic device may compare the general format versions of the first and second biometric templates to determine whether or not they represent the same biometric and/or are from the same person.

By way of illustration, the electronic device may access a first biometric template of a first type via a first external system and a second biometric template of a second type via a second external system, such as by receiving the first biometric template from the first external system and/or the second biometric template from the second external system. The first biometric template may be associated with a first record stored by the first external system and the second biometric template may be associated with a second record stored by the second external system. The electronic device may determine how biometric templates of the first type are formatted, use that determination of how biometric templates of the first type are formatted to translate the first biometric template to a general format, determine how biometric templates of the second type are formatted, use that determination of how biometric templates of the second type are formatted to translate the second biometric template to a general format, and compare the general format versions of the first and second biometric templates.

In various examples, this example method 400 may be implemented as a group of interrelated software modules or components that perform various functions discussed herein. These software modules or components may be executed within a cloud network and/or by one or more computing devices, such as the biometric template translator 101 of FIG. 1 (and/or the identification system device 501 of FIG. 5 discussed below).

Although the example method 400 is illustrated and described as including particular operations performed in a particular order, it is understood that this is an example. In various implementations, various orders of the same, similar, and/or different operations may be performed without departing from the scope of the present disclosure.

For example, the example method 400 illustrates and describes converting both the first and second biometric templates to the general format. However, it is understood that this is an example. In some examples, one or more of the first biometric template and/or the second biometric template may already be in the general format and/or a format that is comparable to the general format (such as one that adheres to a canonical biometric structure like discussed above with respect to FIG. 3). In such an example, translation of that biometric template to the general format may be omitted. Various configurations are possible and contemplated without departing from the scope of the present disclosure.

Figure 5:
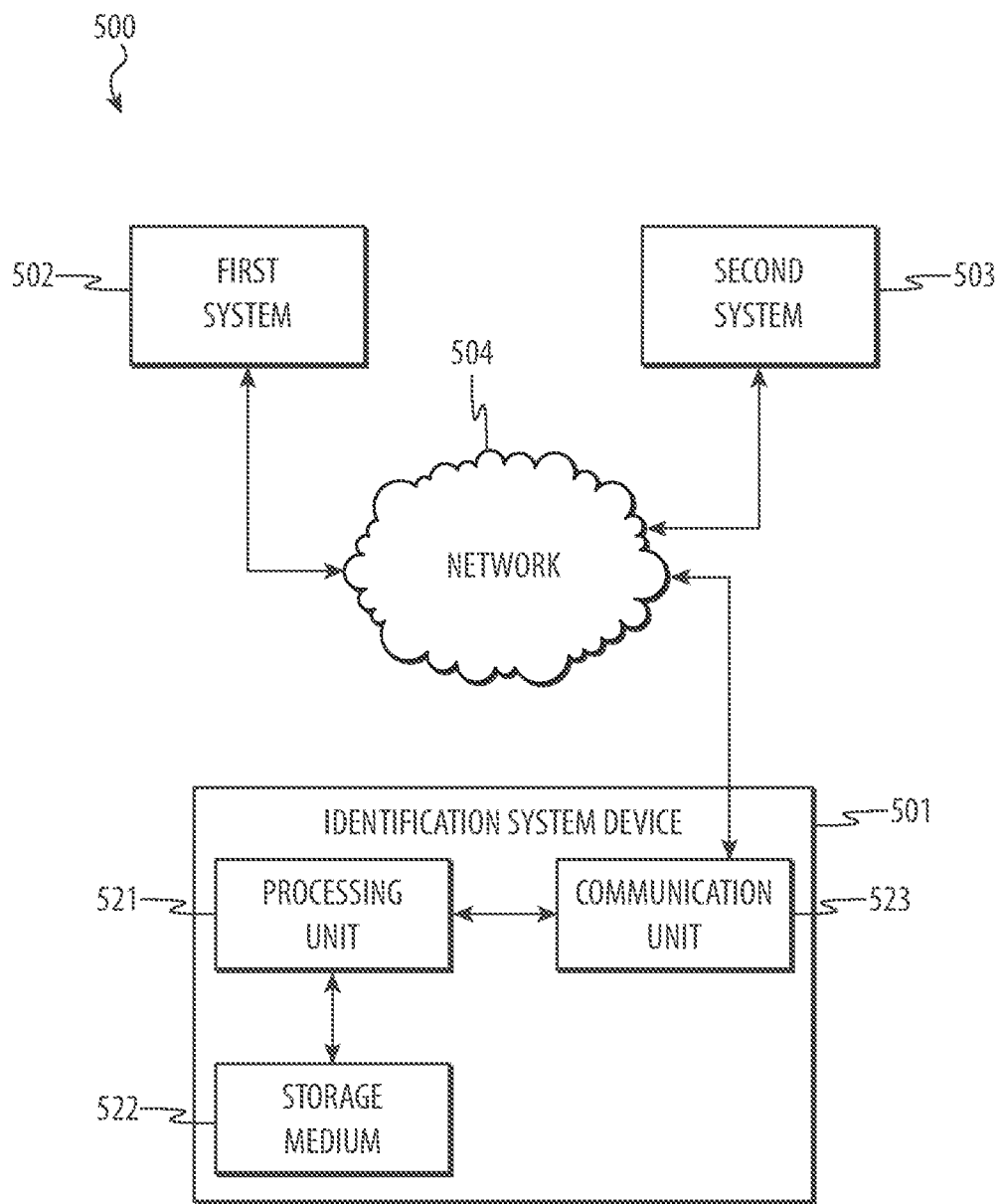
FIG. 5 depicts a second example system for biometric template translation.

FIG. 5 depicts a second example system 500 for biometric template translation. The system includes one or more identification system devices 501 that are operable to communicate with one or more first systems 502 and/or second systems 503 via one or more networks 504.

The identification system device 501 may be operable to communicate with the first system 502 and/or the second system 503 to translate biometric templates of different types and/or perform other functions. For example, the identification system device 501 may be operable to perform identifications using biometric templates received from the first system 502 and/or the second system 503 via the network 504. By way of another example, the identification system device 501 may be operable to compare biometric data stored by the first system 502 and the second system 503, which may involve translating between different types of biometric templates used to generate the respective biometric data. In yet another example, the identification system device 501 may identify a person using a biometric template received from the first system 502 or the second system 503 and translate the biometric template in one or more various ways to compare that to and/or otherwise evaluate biometric data stored by the other of the first system 502 and/or the second system 503.

The identification system device 501 may translate between biometric templates associated with the first system 502 and/or the second system 503. The identification system device 501 may perform one or more methods for translating biometric templates, such as the method 300 of FIG. 3, the method 400 of FIG. 4, the method 600 of FIG. 6 detailed below, the method 700 of FIG. 7 detailed below, and so on.

In one example, identification system device 501 may identify a canonical template structure to which the first and second biometric templates adhere and compare corresponding portions of the first and second biometric templates. In another example, identification system device 501 may identify types and associated formats of the first and second biometric templates in order to translate one or more to a general format that can then be compared. In still other examples, the identification system device 501 may use the first biometric template to determine an identity associated with first biometric data and retrieve second biometric data of a same type as the second biometric template (such as where the first and second biometric data are both stored in association with the identity). In still other examples, the identification system device 501 may use the first biometric template to determine an identity associated with first biometric data and verify that an account in one or more of the first system 502 and/or the second system 503 having a record storing the second biometric template is also associated with the identity, thus allowing translation between the first and second biometric templates through mutual association with the same identity.

The identification system device 501 may be any kind of electronic device and/or cloud and/or other computing arrangement and may include one more processing units 521 and/or other processors or controllers, non-transitory storage media 522, communication units 523, and/or other components. The processing unit 521 may execute one or more sets of instructions stored in the non-transitory storage medium 522 to perform various functions, such as storing biometric data for people and associated identity information (such as one or more names, addresses, telephone numbers, financial data, financial account numbers, verified ages, insurance identifiers, payment account identifiers, and so on), receiving one or more digital representations of biometrics, matching one or more received digital representations of biometrics to stored biometric data, retrieving identity information associated with stored biometric data matching one or more received digital representations of biometrics, providing retrieved identity information, communicating with the first system 502 and/or the second system 503 via the network 504 using the communication unit 523, translating between one or more types of biometric templates, and so on.

Likewise, the first system 502 and/or the second system 503 may be any kind of electronic devices. Examples of such devices include, but are not limited to, one or more desktop computing devices, laptop computing devices, mobile computing devices, wearable devices, tablet computing devices, mobile telephones, smart phones, printers, displays, kiosks, vehicles, kitchen appliances, entertainment system devices, digital media players, and so on. The devices may include one or more processing units and/or other processors and/or controllers, one or more non-transitory storage media (which may take the form of, but is not limited to, a magnetic storage medium; optical storage medium; magneto-optical storage medium; read only memory; random access memory; erasable programmable memory; flash memory; and so on), one or more input and/or output devices (such as one or more keyboards, computer mice, touch screens, touch pads, track pads, microphones, speakers, displays, buttons, dials, switches, printers, and so on), one or more communication units, one or more biometric reader devices (such as a fingerprint scanner, a blood vessel scanner, a palm-vein scanner, an optical fingerprint scanner, a phosphorescent fingerprint scanner, a still image and/or video camera, a 2D and/or 3D image sensor, a capacitive sensor, a saliva sensor, a deoxyribonucleic acid sensor, a heart rhythm monitor, a microphone, and so on), and/or one or more other components. The processing unit may execute one or more sets of instructions stored in the non-transitory storage media to perform various functions, such as using the biometric reader device to obtain one or more digital representations of one or more biometrics (such as one or more hashes and/or other digital representations of one or more fingerprints, blood vessel scans, palm-vein scans, voiceprints, facial images, retina images, iris images, deoxyribonucleic acid sequences, heart rhythms, gaits, and so on) for a person, communicating with the identification system device 501 via the network 504 using the communication unit 523, providing one or more obtained digital representations of biometrics, and so on.

Figure 6:
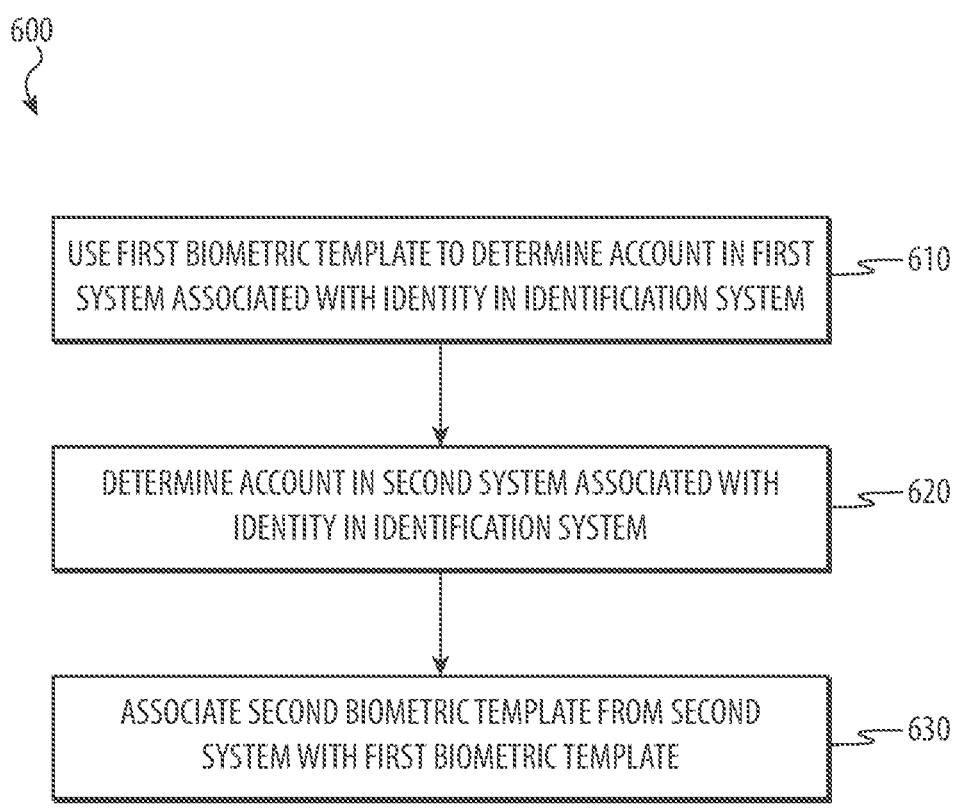
FIG. 6 is a flow chart illustrating a third example method for biometric template translation. This method may be performed by the systems of FIG. 1 or 5.

FIG. 6 is a flow chart illustrating a third example method 600 for biometric template translation. This method 600 may be performed by the systems 100, 500 of FIG. 1 or 5.

At operation 610, an electronic device (such as the biometric template translator 101 of FIG. 1 and/or the identification system device 501 of FIG. 5) may use a first biometric template to determine an account in a first system associated with an identity in an identification system. For example, the electronic device may receive the first biometric template as part of a person interacting with the first system, such as where the person provides a biometric to the first system in order to identify himself for the purpose of checking in for a medical appointment. The first system may generate or obtain the first biometric template, transmit the first biometric template to the identification system, receive information regarding an identity associated with the first biometric template in the identification system, and determine an account in the first system associated with the identity.

At operation 620, the electronic device may determine an account in a second system associated with the identity in the identification system. For example, the identification system may store information regarding various accounts that are associated with the identity, such as the account in the first system and the second system. Upon determining the identity using the first biometric template, the identification system may determine that the identity is associated with the accounts in both the first and the second systems.

The second system may have a second biometric template associated with the account. The second biometric template may be of a different type or format than the first biometric template. As the electronic device has determined that the identity is associated with the account in the first system, the first biometric template, and the account in the second system, the electronic device may determine that this is sufficient to mutually associate the first and second biometric templates with the same identity. As such, the mutual association of the first and second biometric templates with the identity can be effectively used through the identity system to translate between the first and second biometric templates. Thus, at operation 630, the electronic device may associate the second biometric template with the first biometric template. Association may involve copying the second biometric template to the identification system and/or the first system, treating the first and second biometric templates as equivalent for determining the identity (and thus "translated"), and so on.

In various examples, this example method 600 may be implemented as a group of interrelated software modules or components that perform various functions discussed herein. These software modules or components may be executed within a cloud network and/or by one or more computing devices, such as the biometric template translator 101 of FIG. 1 and/or the identification system device 501 of FIG. 5.

Although the example method 600 is illustrated and described as including particular operations performed in a particular order, it is understood that this is an example. In various implementations, various orders of the same, similar, and/or different operations may be performed without departing from the scope of the present disclosure.

For example, the example method 600 is illustrated and described as using the first biometric template to identify an account in the first system associated with the identity. However, in various examples, a first biometric template may be used to determine the identity for the first system without involving any kind of account in the first system. In such an example, the first biometric template may still be associated with a second biometric template from a second system identified as associated with the identity. Various configurations are possible and contemplated without departing from the scope of the present disclosure.

Figure 7:
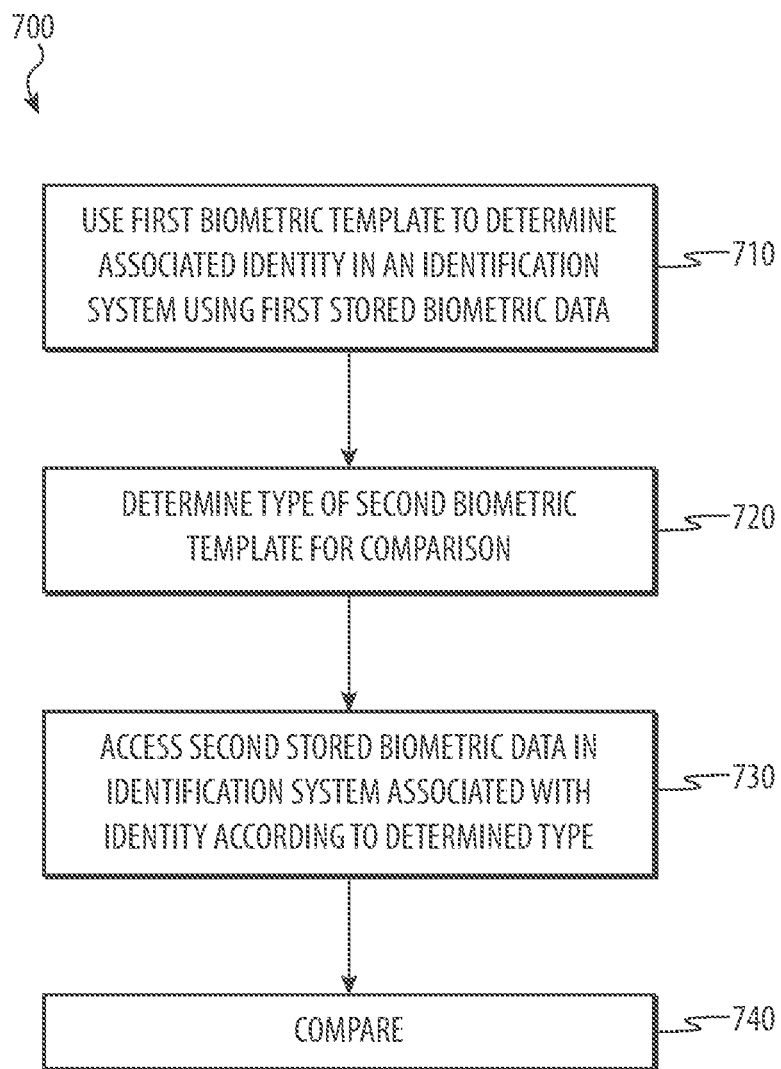
FIG. 7 is a flow chart illustrating a fourth example method for biometric template translation. This method may be performed by the systems of FIG. 1 or 5.

FIG. 7 is a flow chart illustrating a fourth example method 700 for biometric template translation. This method 700 may be performed by the systems 100, 500 of FIG. 1 or 5.

At operation 710, an electronic device (such as the biometric template translator 101 of FIG. 1 and/or the identification system device 501 of FIG. 5) may use a first biometric template to determine an associated identity in an identification system using first stored biometric data. For example, the identification system may associate the first stored biometric data with the identity and may match the first biometric template to the first stored biometric data to determine the identity and/or control access to information associated with the identity.

At operation 720, the electronic device may determine a type of a second biometric template to be compared. The second biometric template may be for comparing to the first stored biometric data and/or the first biometric template. The first biometric template and/or the first biometric data may be of a different type than the second biometric template.

At operation 730, the electronic device may access second stored biometric data in the identification system associated with the identity according to the determined type. The identification system may store biometric data of a number of different types (e.g., different template types) associated with the identity. As such, upon determining the identity using the first biometric template and determining a type of biometric data to use for comparison with a second biometric template, the identification system can serve as a translator by retrieving stored second biometric data of a corresponding type to the second biometric template.

At operation 740, the electronic device can compare the second biometric template with the first biometric template and/or the first stored biometric data by comparing the second stored biometric data with the second biometric template. As the identity is thus associated in the identification system with the first biometric template, the first stored biometric data, and the second stored biometric data, the second stored biometric data can serve as a stand in for the first biometric data and/or the first biometric template.

In various examples, this example method 700 may be implemented as a group of interrelated software modules or components that perform various functions discussed herein. These software modules or components may be executed within a cloud network and/or by one or more computing devices, such as the biometric template translator 101 of FIG. 1 and/or the identification system device 501 of FIG. 5.

Although the example method 700 is illustrated and described as including particular operations performed in a particular order, it is understood that this is an example. In various implementations, various orders of the same, similar, and/or different operations may be performed without departing from the scope of the present disclosure.

For example, the example methods 600 and 700 are illustrated and described as separate processes. However, in some examples, one or more operations may be combined from the example methods 600 and 700 without departing from the scope of the present disclosure.

For example, in some implementations, the example method 700 may include the further operations of associating the first biometric template and/or the second biometric template with a third biometric template stored in a record in an external system when the identity is associated with an account in the external system that corresponds to the record. In such an example, the electronic device may store the third biometric template in association with the identity upon associating the first biometric template and/or the second biometric template with the third biometric template. Various configurations are possible and contemplated without departing from the scope of the present disclosure.

Although the above illustrates and describes a number of embodiments, it is understood that these are examples. In various implementations, various techniques of individual embodiments may be combined without departing from the scope of the present disclosure.

In various implementations, a system for biometric template translation may include at least one non-transitory storage medium that stores instructions and at least one processing unit. The at least one processing unit may execute the instructions to access a first biometric template of a first type and a second biometric template of a second type, identify a canonical template structure to which the first biometric template and the second biometric template adhere, and compare the first biometric template and the second biometric template using the canonical template structure.

In some examples, the at least one processing unit may compare the first biometric template and the second biometric template by using the canonical template structure to identify corresponding portions of the first biometric template and the second biometric template and comparing the corresponding portions. In various such examples, the at least one processing unit may determine that the first biometric template and the second biometric template are from a same person when the corresponding portions match. In some such examples, the at least one processing unit may determine that the first biometric template and the second biometric template are from different people when the corresponding portions are dissimilar.

In various examples, the at least one processing unit may access the first biometric template from a first record in a first system, access the second biometric template from a second record in a second system, and determine whether the first record and the second record are for a same person by comparing the first biometric template and the second biometric template. In some examples, the first biometric template and the second biometric template may both be digital representations of at least one of fingerprints, blood vessel scans, palm-vein scans, voiceprints, facial images, retina images, iris images, deoxyribonucleic acid sequences, heart rhythms, or gaits. In a number of examples, the canonical template structure may detail standard features of biometric templates that adhere to the canonical template structure.

In some implementations, a system for biometric template translation may include at least one non-transitory storage medium that stores instructions and at least one processing unit. The at least one processing unit may execute the instructions to access a first biometric template, identify a first type of the first biometric template, determine a first format associated with the first type, use the first format to translate the first biometric template to a general format version of the first biometric template, and compare the general format version of the first biometric template with a second biometric template.

In various examples, the at least one processing unit may compare the general format version of the first biometric template with a second biometric template by identifying a second type of the second biometric template, determining a second format associated with the second type, using the second format to translate the second biometric template to a general format version of the second biometric template, and comparing the general format version of the first biometric template with the general format version of the second biometric template.

In some examples, the at least one processing unit may access the first biometric template via a first external system and the second biometric template via a second external system. In various such examples, the first biometric template may be associated with a first record stored by the first external system and the second biometric template may be associated with a second record stored by the second external system. In some such examples, the at least one processing unit may receive the first biometric template from the first external system.

In various examples, the at least one processing unit may identify the first type by analyzing the first biometric template. In some examples, the at least one processing unit may identify the first type using a type indicator associated with the first biometric template.

In a number of implementations, a system for biometric template translation may include at least one non-transitory storage medium that stores instructions and at least one processing unit. The at least one processing unit may execute the instructions to determine an identity of a person in an identification system using a first biometric template and first stored biometric data for the person, determine a type associated with a second biometric template, access second stored biometric data that is associated with the identity in the identification system and corresponds to the type, and compare the second biometric template to the second stored biometric data.

In various examples, the at least one processing unit may associate at least one of the first biometric template or the second biometric template with a third biometric template stored in a record in an external system when the identity is associated with an account in the external system that corresponds to the record. In some such examples, the at least one processing unit may store the third biometric template in association with the identity upon associating the at least one of the first biometric template or the second biometric template with the third biometric template.

In a number of examples, the identification system may store identity information for the person and control access to the identity information using the first stored biometric data. In some examples, the identification system may store multiple sets of biometric data for the person that are each associated with different template types. In various examples, the first biometric template and the second biometric template may be of different types.

As described above and illustrated in the accompanying figures, the present disclosure relates to biometric template translation that enables comparison of different types of biometric templates. A first biometric template of a first type is translated in order to enable the translated biometric template to be compared to a second biometric template of a second type. In one example, a canonical template structure to which the first and second biometric templates adhere may be identified and used to compare corresponding portions of the first and second biometric templates. In another example, types and associated formats of the first and second biometric templates may be identified to enable both to be translated to a general format that can then be compared. In still other examples, an identification system may use the first biometric template to determine an identity associated with first biometric data and retrieve second stored biometric data associated with the identity of a same type as the second biometric template. In still other examples, an identification system may use the first biometric template to determine an identity associated with first biometric data and verify that an account in an external system having a record storing the second biometric template is also associated with the identity, thus allowing translation between the first and second biometric templates through mutual association with the same identity. In this way, the biometric template translation may enable compatibility between different biometric systems. This may prevent duplication of systems and/or components, enable functions not previously performable, improve hardware and/or software performance of systems and/or components, and/or reduce consumption of hardware and/or software resources.

The present disclosure recognizes that biometric and/or other personal data is owned by the person from whom such biometric and/or other personal data is derived. This data can be used to the benefit of those people. For example, biometric data may be used to conveniently and reliably identify and/or authenticate the identity of people, access securely stored financial and/or other information associated with the biometric data, and so on. This may allow people to avoid repeatedly providing physical identification and/or other information.

The present disclosure further recognizes that the entities who collect, analyze, store, and/or otherwise use such biometric and/or other personal data should comply with well-established privacy policies and/or privacy practices. Particularly, such entities should implement and consistently use privacy policies and practices that are generally recognized as meeting or exceeding industry or governmental requirements for maintaining security and privately maintaining biometric and/or other personal data, including the use of encryption and security methods that meets or exceeds industry or government standards. For example, biometric and/or other personal data should be collected for legitimate and reasonable uses and not shared or sold outside of those legitimate uses. Further, such collection should occur only after receiving the informed consent. Additionally, such entities should take any needed steps for safeguarding and securing access to such biometric and/or other personal data and ensuring that others with access to the biometric and/or other personal data adhere to the same privacy policies and practices. Further, such entities should certify their adherence to widely accepted privacy policies and practices by subjecting themselves to appropriate third party evaluation.

Additionally, the present disclosure recognizes that people may block the use of, storage of, and/or access to biometric and/or other personal data. Entities who typically collect, analyze, store, and/or otherwise use such biometric and/or other personal data should implement and consistently prevent any collection, analysis, storage, and/or other use of any biometric and/or other personal data blocked by the person from whom such biometric and/or other personal data is derived.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A system for biometric template translation, comprising:
    at least one non-transitory storage medium that stores instructions; and
    at least one processor that executes the instructions to:
       determine an identity of a person in an identification system using a first biometric template and first stored biometric data for the person;
       determine a type associated with a second biometric template;
       access second stored biometric data that is associated with the identity in the identification system and corresponds to the type; and
       compare the second biometric template to the second stored biometric data.

2. The system of claim 1, wherein the at least one processor associates at least one of the first biometric template or the second biometric template with a third biometric template stored in a record in an external system when the identity is associated with an account in the external system that corresponds to the record.

3. The system of claim 2, wherein the at least one processor stores the third biometric template in association with the identity upon associating the at least one of the first biometric template or the second biometric template with the third biometric template.

4. The system of claim 1, wherein the identification system:
    stores identity information for the person; and
    controls access to the identity information using the first stored biometric data.

5. The system of claim 1, wherein the identification system stores multiple sets of biometric data for the person that are each associated with different template types.

6. The system of claim 1, wherein the first biometric template and the second biometric template are of different types.

7. The system of claim 1, wherein the second stored biometric data is accessed from stored biometric data of a number of different types.

8. The system of claim 7, wherein the number of different types correspond to different template types.

9. The system of claim 7, wherein the number of different types are all associated with the identity.

10. The system of claim 1, wherein the first biometric template and the second biometric template correspond to different matching engines.

11. The system of claim 1, wherein the at least one processor determines the type by analyzing the second biometric template.

12. The system of claim 1, wherein the at least one processor determines the type using a type indicator associated with the second biometric template.

13. The system of claim 1, wherein the at least one processor accesses:
- the first biometric template via a first external system; and
- the second biometric template via a second external system.

14. The system of claim 13, wherein:
- the first biometric template is associated with a first record stored by the first external system; and
- the second biometric template is associated with a second record stored by the second external system.

15. The system of claim 13, wherein the at least one processor receives the first biometric template from the first external system.

16. The system of claim 1, further comprising controlling access to stored identity information associated with the second biometric template.

17. A method, comprising:
- determining an identity of a person in an identification system, using at least one processor, using a first biometric template and first stored biometric data for the person;
- accessing second stored biometric data, using the at least one processing unit that is associated with the identity in the identification system, the second stored biometric data being of a corresponding type to the second biometric template; and
- comparing the second biometric template to the second stored biometric data, using the at least one processor.

18. The method of claim 17, further comprising accessing stored identity information associated with the second biometric template when the first biometric template corresponds to the second biometric template.

19. The method of claim 18, further comprising associating at least one of the first biometric template or the second biometric template with a third biometric template stored in the record.

20. The method of claim 17, further comprising determining that the identity is associated with an account in an external system that corresponds to a record.

* * * * *